---

United States Patent Office 3,478,007
Patented Nov. 11, 1969

3,478,007
POLYMERIZING UNSATURATED CYCLIC HYDROCARBONS USING AS CATALYSTS AlCl$_3$+R$_3$SiX
Lloyd B. Barkley, Pittsburgh, and Anargiros P. Patellis, Belle Vernon, Pa., assignors to Pennnsylvania Industrial Chemical Corporation, Clairton, Pa., a corporation of Pennsylvania
No Drawing. Filed Jan. 17, 1966, Ser. No. 520,918
Int. Cl. C08f 5/00, 7/02, 1/28
U.S. Cl. 260—88.2     12 Claims

ABSTRACT OF THE DISCLOSURE

An unsaturated cyclic hydrocarbon of the group alpha pinene, beta pinene, turpentine, dipentene and vinyl cyclohexene dissolved in an inert solvent in a closed container is polymerized by adding the hydrocarbon incrementally and with stirring to a solution of trialkyl silicon halide and aluminum chloride while controlling the temperature in the liquid body to about minus 15° C. to 40° C., continuing to stir for a period after the addition of said hydrocarbon, hydrolyzing the catalyst, separating the resultant hydrocarbon phase and heating it to drive off solvent, and then steam distilling the residue and recovering solid polymer of said hydrocarbon. Initially, the hydrocarbon and the solvent are dried to contain not more than about fifty parts per million of water, and the reaction is conducted in an inert gaseous atmosphere.

---

This invention relates to polymers of bicyclic monoterpenes, such as alpha pinene and beta pinene, mixtures thereof, such as turpentine, and to polymers of other unsaturated cyclic hydrocarbons, such as dipentene.

Beta pinene resins have been made and used on a very large scale for many years because they possess a combination of desirable properties. For example, they exhibit high solubility in hydrocarbon solvents such as are used in the manufacture of paints, adhesives, and varnishes, they are compatible with a wide variety of waxes, oils, bituminous materials and other resinous substances such as rosin, ester gums, coumarone-indene resins, and various others. A particularly advantageous property of beta pinene resins is that of relatively high softening point, for instance 125° to 135° C. (ring and ball). Also, they can be produced of color range from 2 to 5 on the Gardner scale. Such properties adapt the beta pinene resins to a wide variety of uses including not only the manufacture of paints and varnishes but also for the compounding of rubber and rubber tile compositions, paper coating compositions, printing inks, pressure sensitive adhesives, and a variety of other uses.

Beta pinene is produced chiefly by the distillation of turpentine, the alpha pinene content of which remains as a material which has had no particular utility as a monomer for commercial resin manufacture because the polymerization systems applied do not result in economical yields of resins of the desired high melting point.

The primary object of the present invention is to provide a method of catalytically polymerizing alpha pinene to produce high yields of resin of good color and of much higher melting point than was attained with previous attempts to polymerize this terpene, as by aluminum chloride or other Friedel-Crafts catalysts, which is simple, easily practiced with standard equipment, makes use of commercially available catalytic materials, and does not require technically trained operators.

Another object is to provide alpha pinene resins in accordance with the foregoing object which are optically active.

A further object is to provide a method that is applicable to the polymerization of other unsaturated cyclic hydrocarbons such, for example, as bicyclic monoterpenes, e.g. beta pinene, turpentine, dipentene and vinyl cyclohexene, whereby to produce good yields of resins of melting points adequate for commercial purposes and of lower chlorine content than results from polymerization of these compounds with aluminum chloride, and in which the objectionable sludging that is encountered when these compounds are polymerized with aluminum chloride is minimized.

Yet another object is to provide a co-catalyst system for the practice of the methods of this invention.

A further object is to provide alpha pinene polymers of at least 110° C. softening point, of relatively high molecular weight, and which are not only similar to beta pinene polymers in solubility characteristics and uses but also exhibit solubility characteristics different from those of beta pinene polymers.

Still another object is to provide a method of continuously practicing the methods of the foregoing objects.

Another object is to provide alpha pinene resins of higher softening point and molecular weight than have been available prior to our invention.

Other objects will appear hereinafter.

The invention is predicated upon our discovery that its stated objects are attained with co-catalysts of (1) aluminum chloride and (2) a member of the group consisting of lower trialkyl silicon chlorides, lower dialkyl phenyl silicon halides, and hexaloweralkyl disiloxanes. The disubstituted and the monosubstituted silicon halides and their hydrolysis products do not form co-catalysts with AlCl$_3$ for the purposes of this invention. For the purposes of this invention lower alkyl groups of 1 to 18 carbon atoms suffice.

In the preferred practice of the invention there is first prepared a solution of the co-catalyst in an inert solvent, and the alpha pinene is then added incrementally with vigorous stirring while maintaining the reaction body at from about minus 15° to 40° C. to insure maximum yield of resin of maximum softening point. After the alpha pinene has been added stirring and cooling are continued for a period of time, at least 15 minutes, following which the catalyst is quenched with water with production of an oily phase and an aqueous phase. The alpha pinene polymer resin is then recovered by standard practices, as by steam distillation, from the oily phase. The process may be continuous as pointed out hereinafter.

As solvents, or diluents, aromatic hydrocarbons are preferably used, e.g., xylene, diethyl benzenes, Solvesso 100 (98% aromatics, 0.876 sp. gr., 116° F. closed cup flash point, 321° F. initial boiling point, 50% off at 328° F., 349° end point). Other solvents that might be used are halogenated hydrocarbons, both aliphatic and aromatic.

The ratio of the organo silicon constituent to aluminum chloride may vary within wide limits. Preferably, a weight ratio of 1 part by weight of the organo silicon constituent to 5 parts by weight of aluminum chloride is used. Optimum ratios for the various organo silicon constituents and for particular unsaturated cyclic hydrocarbons are readily determined as those familiar with the polymerization art will understand. In the case of alpha pinene we have found that satisfactory results are to be had with co-catalysts of 5 parts by weight of AlCl$_3$ and 1 part of Me$_3$SiCl.

In general, small amounts of these catalysts relative to the amount of alpha pinene (or other unsaturated cyclic hydrocarbon) monomer suffice, and here again the optimum ratios are readily determined by simple trial runs. In the case of alpha pinene we have found that with the just mentioned specific co-catalyst from about 5 to 7 percent by weight based on the alpha pinene provides optimum results. Smaller amounts of catalyst, even as low as 2 percent, may be used with freshly fractionated alpha pinene of high purity.

An important and critical feature of the invention in the production of the high yields of high softening point resin which characterize the invention is to supply the reactants and the solvent in thoroughly dried condition, and in the case of alpha pinene and turpentine to exclude their oxidation products from the reaction system during polymerization because alpha pinene and turpentine are reactive with oxygen so that the presence of those products in other than extremely minute amounts results in decreased yields and lower softening point. According to our investigations the alpha pinene and the solvent used should contain a total of not more than 50 parts per million (p.p.m.) of water. Greater amounts of water result in decreased yields and resin of lower softening point.

Reduction of the water content of the alpha pinene and the solvents is accomplished readily by drying them over molecular sieves, suitably Linde 5A, or with alkaline alumina. As a further precaution to avoid the objectionable effect of moisture, the reaction vessel and associated equipment should be well dried immediately prior to use, as by heating to, for example, 150° C.

In the preferred practice of the invention, then, the alpha pinene and the solvent are appropriately dried, for instance in the manner just indicated, the reaction vessel and associated parts to which the catalyst and the alpha pinene will be exposed, is likewise dried, and a current of inert gas, suitably dry nitrogen, is started through the system. The solvent and catalyst are introduced into the vessel and the alpha pinene is then added incrementally and progressively, for instance in dropwise fashion, while vigorously stirring the reaction body. As soon as the alpha pinene is added an exotherm occurs and cooling is initiated to maintain the reaction body by appropriate means at minus 15° C. to 40° C., but preferably at about 15° to 20° C. Stirring and temperature control are continued for a period of time after all of the alpha pinene has been added. In general 15 minutes to two hours suffices for the latter purpose.

At the end of this time the reaction body is quenched to hydrolyze the catalyst, as by adding a volume of water equal to the volume of alpha pinene used. If preferred, there may be used a dilute solution of an alkali, e.g. potassium hydroxide, instead of water. In either case there are formed an oil phase and an aqueous phase. These are separated and the oily hydrocarbon layer is washed repeatedly with equal amounts of water.

After the final water wash the hydrocarbon phase is charged to a suitable still and an inert gas, suitably nitrogen, is bubbled through the liquid while bringing the temperature up to about 210° C. to remove the solvent and hexaalkyl disiloxane formed by hydrolysis of the trialkyl silicon chloride. The recovered solvent containing the disiloxane may be recycled to the reactor where fresh AlCl₃ is added, thereby reforming (CH₃)₃SiCl. Subsequent addition of alpha pinene as described above leads to the same high yield of resin as was formed in the first batch. Upon evaporation of the solvent the disiloxane may be added to fresh alpha pinene and AlCl₃ which reforms (CH₃)₃SiCl and which in turn is converted to disiloxane upon hydrolysis after polymerization. This ability to recycle the more expensive of the two catalyst materials is a major factor in the economy of the process.

At this point dry steam is substituted in place of the inert gas and the temperature is raised to 240° C. and steaming is continued until the steam condensate to oil ratio is about 20:1, when the resin is recovered and dried.

The alpha pinene monomer should be of quite high purity, in fact, the purer the pinene the better the economy of the operation. Alpha pinene of 95 percent purity is commercially available and will give satisfactory results. A product of higher purity is preferably used, however, such as that sold as Acintene A (available from the Arizona Chemical Company). This material analyzes by gas chromatography 95 percent of alpha pinene, 3.9 percent of camphene, and 1.1 percent of beta pinene. It is normal for the alpha pinene commercially available to contain small amounts of both camphene and beta pinene but this is not objectionable for the beta pinene is polymerized to resin of high softening point, and the camphene does not hinder the polymerization or exert any deleterious effect upon the properties of the resin.

As an example of the practice of the invention, alpha pinene and xylene were separately dried to 10 p.p.m. water over a 5A molecular sieve. A glass three-neck flask, glass separatory funnel and a stainless steel stirrer were dried in an oven at 150° C. When the equipment was assembled a stream of dry nitrogen was passed through the flask and flow was maintained during the duration of the run. Sixty-seven grams of the dried xylene were charged to the flask and there were added 5 grams of AlCl₃ and one gram of (CH₃)₃SiCl, providing a ratio of 5:1. The catalyst solution was agitated by operation of the stirrer, 100 grams of the dried alpha pinene were added from the separatory funnel over a period of 30 minutes. The reaction body was held at minus 15° to 20° C. by a Dry Ice-alcohol bath during the 6 to 10 minutes it took to introduce the alpha pinene. Thereafter the contents of the flask were maintained at temperature for two hours while passing the nitrogen stream through it. At the end of that time there was added water equal in volume to the alpha pinene used to destroy and remove the AlCl₃, to hydrolize the (CH₃)₃SiCl, and to cause phase separation. The resultant phases were separated, and the hydrocarbon phase was washed three times with equal amounts of water. It was then charged to a flask provided with a thermometer and a bubbler tube and nitrogen was bubbled through the liquid while bringing the temperature up to 210° C., thus removing the solvent and recovering about 85 percent of the silicon constituent charged for re-use, with make-up (CH₃)₃SiCl, as alluded to above. At that point the introduction of gas was discontinued and in its place dry steam was passed in until the temperature reached 230° to 240° C. Steaming was continued until the ratio of condensate to oil reached 20:1. The resin was separated from the condensate. The results of this run were:

Resin yield _____ 70% by weight.
Softening point _____ 115°–130° C.—ring and ball.
Color _____ G3.
Cl _____ 150–200 p.p.m.
Oil yield _____ 20% by weight.

The following table is illustrative of the wide variety of silicon constituents that may be used in practicing the invention as described above.

| Catalyst System | Ratio, AlCl₃/Silane | Cat. Percent | Resin Yield | Soft. Pt., ° C. |
| --- | --- | --- | --- | --- |
| [(CH₃)₂n-C₆H₁₃-Si]₂O | 5:1 | 5 | 70 | 96 |
| [(CH₃)₂n-C₁₈H₃₇]SiCl | 5:1 | 5 | 69 | 100 |
| [(CH₃)₂HSi]₂O | 5:1 | 5 | 38 | 100 |
| C₆H₅(CH₃)₂SiCl | 5:1 | 5 | 70 | 122 |
| [C₆H₅CH(CH₃)CH₂(CH₃)₂Si]₂O | 5:1 | 5 | 56 | 83 |
| [C₂H₅(CH₃)₂Si]₂O | 5:1 | 5 | 70 | 103 |
| (CH₃)₃SiCl | 5:1 | 5 | 70 | 124 |
| [(CH₃)₃Si]₂O | 5:1 | 5 | 70 | 118 |

Typically, alpha pinene polymers prepared in this way will have a molecular weight of 700 to 800 (cryoscopic), a bromine number of about 15 to 25 and a softening point of at least about 110° C. These polymers are soluble in all solvents for beta pinene polymers, such as hexane, benzene, heptane, toluene, xylene and mineral spirits. However, they differ from the beta pinene polymers in exhibiting solubility in methyl ethyl ketone, dioxane, ethyl acetate and cyclohexanol. They differ likewise in lower melt viscosity, and natural rubber requires less milling in making pressure-sensitive tapes.

Prior proposals for the making of alpha pinene polymers generally involve polymerization with aluminum chloride. The resultant reaction body was stripped to obtain resin of, for example, 80° C. softening point. The yield was so low as to be wholly uneconomical; if the stripping was to a lesser extent (to increase yield) the softening point was so low (e.g., so soft that a ball and ring determination could not be made at room temperature) as to be unsuited to commercial use. As far as we are aware, prior to our invention no alpha pinene resin had been used commercially.

These co-catalysts are applicable also advantageously to the polymerization of other unsaturated cyclic compounds, examples being beta pinene and vinyl cyclohexene; in the case of these compounds scrupulous drying and protection against moisture and oxygen are unnecessary. As exemplifying the polymerization of beta pinene, in one run there were used 120 grams of undried beta pinene, 180 grams of undried Solvesso 100, 2.5 grams of $AlCl_3$ and 0.06 gm. of trimethyl chlorosilane. Following the procedure of the alpha pinene example, the soaking period after addition of the beta pinene was but one hour. The result, obtained as in the case of alpha pinene, was:

Yield _____ percent__ 94
Softening point _____ ° C__ 138
Color _____ G3
Chlorine _____ p.p.m__ 200

Using the same procedure without the $(CH_3)_3SiCl$ the results were:

Yield _____ percent__ 92
Softening point _____ ° C__ 134
Color _____ G3
Chlorine _____ p.p.m__ 930

It is to be observed that the product of this invention was of greatly reduced chlorine content as compared with resin made with $AlCl_3$ alone. This is of major significance commercially.

Those familiar with the polymerization art will recognize that although the invention has been exemplified with reference to individual monomers it is equally applicable to mixtures of two or more such monomers, an example being the polymerization of a turpentine fraction boiling up to 170° C. and comprising predominantly alpha and beta pinenes.

It will be understood from what has been said that unsaturated cyclic hydrocarbons, and especially bicyclic monoterpenes, are polymerized by a co-catalyst of a trialkyl silicon chloride and aluminum chloride. As described, the prepared catalyst or its components may be added to the solvent followed by addition of the unsaturated cyclic hydrocarbon. Alternative procedures may be used. Thus, the hydrocarbon may be added with the trialkyl silicon halide to the solvent followed by addition of the $AlCl_3$. Or, they may be charged together the solvent and the $AlCl_3$, the silicon halide is then dissolved in the hydrocarbon and added dropwise. In all such cases there is a solution of the co-catalyst which effects the polymerization.

In a typical continuous reaction the process is started up as in normal reverse addition batch runs, i.e. the monomer is added to a solution of solvent and catalyst as described above. Modifications of the batch technique may also be used, e.g. adding all or a portion of the silicon halide with the monomer. The reaction products are passed to a continuous flow system into which there are metered a solution of the co-catalyst and the hydrocarbon while controlling the temperature at the desired point, e.g. minus 15° to 25° C., and the run may be continued indefinitely. From this system the products are discharged appropriately, quenched and worked up.

Among the advantages in continuous processing are (a) the elimination of the need for rapid monomer charging and the heat control problems associated with this, (b) the better control of product color and (c) a more economical method of producing large quantities of product.

The polymers provided by the invention are useful for the purpose to which beta pinene polymers are applied.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:
1. That method of polymerizing an unsaturated cyclic hydrocarbon of the group consisting of alpha pinene, beta pinene, turpentine, dipentene and vinyl cyclohexene dried to contain not more than fifty parts per million of water, comprising the steps of forming a solution of trialkyl silicon halide and aluminum chloride in an inert solvent in a closed container with an inert atmosphere, adding said hydrocarbon incrementally and with stirring while controlling the temperature in the liquid body at about minus 15° C. to 40° C. and continuing to do so with stirring for a period after the addition of said hydrocarbon, hydrolyzing the catalyst, separating the resultant hydrocarbon phase and heating it to drive off solvent, and then steam distilling the residue and recovering solid polymer of said hydrocarbon.

2. A method according to claim 1, said alkyl halide having from 1 to 18 carbon atoms in the alkyl group.

3. A method according to claim 2, said hydrocarbon being alpha pinene.

4. The method of polymerizing an unsaturated cyclic hydrocarbon comprising the steps of removing water from said hydrocarbon and adding it incrementally and with stirring to a dried solution of a trialkyl silicon halide and aluminum chloride in a dry inert solvent, controlling the temperature in the liquid body at about minus 15° C. to 40° C. and continuing to do so with stirring for a period after the addition of said hydrocarbon, hydrolyzing the catalyst, recovering the resultant hydrocarbon phase and washing it with water, then heating said phase to drive off solvent followed by steam distilling the residue and recovering solid polymer of said hydrocarbon.

5. A method according to claim 4, said trichloride plus $AlCl_3$ being present in an amount of about 5 to 7 percent by weight of said hydrocarbon.

6. The method of polymerizing a mixture of at least two bicyclic unsaturated hydrocarbons comprising the steps of forming a solution of a trialkyl silicon halide and aluminum chloride in a dry inert solvent in a closed container, adding said hydrocarbon mixture incrementally and with stirring to said solution while controlling the temperature in the liquid body at about minus 15° C. to 25° C. and continuing to do so after the addition of said hydrocarbon mixture, hydrolyzing the catalyst, recovering the resultant hydrocarbon phase and washing it with water, then heating to drive off solvent followed by steam distilling, and recovering solid hydrocarbon polymer.

7. A method according to claim 6, said mixture being a turpentine fraction boiling up to 170° C.

8. The method of making a polymer of at least one unsaturated cyclic hydrocarbon selected from the group consisting of alpha pinene, beta pinene and vinyl cyclohexene comprising the steps of forming a solution of a trialkyl silicon halide and aluminum chloride in a dry solvent in a closed container, passing a dry inert gas through the container, drying said hydrocarbon and adding it incrementally and with stirring to said solution, controlling the temperature in the liquid body at about minus 15° C. to 40° C. and continuing to do so with stirring for a period after the addition of said hydrocarbon, hydrolyzing the catalyst with water, separating the resultant hydrocarbon phase and washing it with water, then heating said phase to drive off solvent followed by steam distilling, and recovering the solid polymer of said hydrocarbon.

9. The method of polymerizing an unsaturated cyclic hydrocarbon comprising the steps of continuously passing into a closed container the hydrocarbon monomer and a solution of a trialkyl silicon halide and aluminum chloride in a dry solvent, stirring the container contents and controlling the temperature in the liquid body at about minus 15° C. to about 40° C. continuously passing the reaction body into a second container at the reaction temperature, withdrawing reaction body from the latter, hydrolyzing the catalyst with water, separating the resultant hydrocarbon phase and washing it with water, then heating said phase to drive off solvent followed by steam distilling, and recovering the solid polymer of said hydrocarbon.

10. A method according to claim 1 in which the hexamethyl disiloxane formed during hydrolysis is recycled to minimize catalyst costs.

11. A cyclic unsaturated hydrocarbon co-catalyst consisting essentially of a solution of aluminum chloride and a member of the group consisting of lower trialkyl silicon chlorides, lower dialkyl phenyl silicon halides, and hexaloweralkyl disiloxanes in a dry inert solvent.

12. A catalyst according to claim 11, said halide being trimethyl silicon chloride.

References Cited

UNITED STATES PATENTS

| | | | |
|---|---|---|---|
| 3,354,132 | 11/1967 | Sproat | 260—93.3 |
| 3,299,170 | 1/1967 | Gonzenbach | 260—93.3 |
| 2,932,631 | 4/1960 | Rummelsburg | 260—93.3 |
| 2,205,108 | 6/1940 | Rosen | 260—93.3 |
| 2,180,418 | 11/1939 | James | 260—93.3 |
| 3,313,865 | 4/1967 | Vohwinkel | 260—93.3 |

OTHER REFERENCES

Kashireninov, Chem. Abs. 12227(a), vol. 59, November 1963 (Physicochemical Properties and Catalytic Activity of Complexes of Certain Tin Organic Compounds with Titanium Tetrachloride and Aluminum Trichloride, Materially [Tretei] Nauchn. Konf. Aspiranlov Sb. (1961), 158-62.

JOSEPH L. SCHOFER, Primary Examiner

R. A. GAITHER, Assistant Examiner

U.S. Cl. X.R.

252—429; 260—93.1, 93.3